US009695935B2

(12) United States Patent
Oiyama et al.

(10) Patent No.: US 9,695,935 B2
(45) Date of Patent: Jul. 4, 2017

(54) SEALING DEVICE

(71) Applicant: EAGLE INDUSTRY CO., LTD., Tokyo (JP)

(72) Inventors: Koichiro Oiyama, Tokyo (JP); Yusaku Nakazono, Tokyo (JP); Yasuhisa Arita, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 14/422,237

(22) PCT Filed: Aug. 23, 2013

(86) PCT No.: PCT/JP2013/072556
§ 371 (c)(1),
(2) Date: Feb. 18, 2015

(87) PCT Pub. No.: WO2014/030742
PCT Pub. Date: Feb. 27, 2014

(65) Prior Publication Data
US 2015/0192205 A1     Jul. 9, 2015

(30) Foreign Application Priority Data

Aug. 23, 2012  (JP) ................................ 2012-184388
Jul. 5, 2013   (JP) ................................ 2013-141708

(51) Int. Cl.
*F16J 15/32*   (2016.01)
*F16J 15/00*   (2006.01)
(Continued)

(52) U.S. Cl.
CPC ........... *F16J 15/002* (2013.01); *F16J 15/322* (2013.01); *F16J 15/324* (2013.01); *F16J 15/3232* (2013.01); *F16J 15/3268* (2013.01)

(58) Field of Classification Search
CPC .. F16J 15/3268; F16J 15/3232; F16J 15/3236; F16J 15/3228; F16J 15/002; F16J 15/322; F16J 15/324
(Continued)

(56) References Cited

U.S. PATENT DOCUMENTS 2,434,484 A      1/1948  Chambers, Jr.
5,083,802 A *    1/1992  Shimasaki et al. ........... 277/560
(Continued)

FOREIGN PATENT DOCUMENTS

CN        1205064 A      1/1999
CN      201339716 Y     11/2009
(Continued)

OTHER PUBLICATIONS

Chinese Office Action dated Dec. 2, 2015.
(Continued)

*Primary Examiner* — Kristina Fulton
*Assistant Examiner* — Nathan Cumar
(74) *Attorney, Agent, or Firm* — Harness, Dickey & Pierce, P.L.C.

(57) ABSTRACT

A sealing device that suppresses degradation of sealing properties resulting from conduction of heat generated by sliding of a resin-made sealing member and a rotating shaft to a rubber-made sealing member. The sealing device includes a rubber sealing member (110), a resin sealing member (120), a support ring (130), and a case (180), the support ring (130) has: a large diameter portion (131); an inward flange (135) that extends inwardly in a radial direction from an end portion of the large diameter portion (131) on an air side, and has a notch (135*a*) with which a nail portion (183) of the case is engaged; a small diameter portion (133) that is in contact with an inner peripheral
(Continued)

surface of a lip portion (112) of the rubber sealing member (110); and a lip retaining portion (134).

2 Claims, 7 Drawing Sheets

(51) Int. Cl.
*F16J 15/322* (2016.01)
*F16J 15/3232* (2016.01)
*F16J 15/3268* (2016.01)
*F16J 15/324* (2016.01)

(58) Field of Classification Search
USPC ....... 277/551, 309, 562, 345, 346, 349, 353, 277/549
See application file for complete search history.

(56) References Cited

U.S. PATENT DOCUMENTS

| | | | | |
|---|---|---|---|---|
| 5,607,168 A * | 3/1997 | Dahll | ............ | F16J 15/3232 264/268 |
| 6,123,514 A * | 9/2000 | Kawaguchi et al. | ...... | 417/222.2 |
| 6,367,811 B1 * | 4/2002 | Hosokawa | ............ | F16J 15/3216 277/560 |
| 6,428,012 B1 * | 8/2002 | Amaral | ............ | F16J 15/3472 277/372 |
| 2009/0134585 A1 * | 5/2009 | Shimomura | ............ | F16J 15/3216 277/562 |
| 2010/0059937 A1 * | 3/2010 | Castleman | ............ | F16J 15/3236 277/309 |
| 2010/0320698 A1 * | 12/2010 | Shimomura | ............ | F16J 15/3228 277/572 |
| 2011/0215536 A1 | 9/2011 | Itadani et al. | | |
| 2012/0169015 A1 | 7/2012 | Oiyama et al. | | |
| 2013/0170775 A1 * | 7/2013 | Cymbal et al. | ............ | 384/456 |

FOREIGN PATENT DOCUMENTS

| | | |
|---|---|---|
| CN | 101842622 A | 9/2010 |
| EP | 2351951 A1 | 8/2011 |
| JP | 62-059366 | 4/1987 |
| JP | H01-077169 U | 5/1989 |
| JP | 03-041264 | 4/1991 |
| WO | 9802681 A1 | 1/1998 |
| WO | 2010061670 A1 | 6/2010 |
| WO | 2011030585 A1 | 3/2011 |

OTHER PUBLICATIONS

Chinese Office Action dated Jun. 15, 2016 with English translation.
European Search Report dated Mar. 9, 2016.
Japanese Office Action dated Feb. 28, 2017 with partial English translation.

* cited by examiner

SEALING DEVICE

CROSS-REFERENCE TO RELATED APPLICATIONS

This application is a National Stage of International Application No. PCT/JP2013/072556, filed Aug. 23, 2013, which claims priority to Japanese Application No. 2013-141708, filed Jul. 5, 2013 and Japanese Application No. 2012-184388, filed Aug. 23, 2012. The entire disclosures of each of the above applications are incorporated herein by reference.

FIELD

The present disclosure relates to a sealing device for sealing an annular gap between a rotating shaft and a housing having a shaft hole into which the rotating shaft is inserted.

BACKGROUND

Conventionally, sealing devices disclosed in Patent Literatures 1 and 2 are known. A sealing device according to the conventional art disclosed in Patent Document 1 will be described herein. The sealing device disclosed in Patent Document 1 is mounted in an inner peripheral surface of a shaft hole of a housing, and seals an annular gap between a rotating shaft and the housing having the shaft hole into which the rotating shaft is inserted. The sealing device includes a metal case, and individual constituent parts of the sealing device are retained by the case and are integrally constructed as a cartridge. In addition, the sealing device includes a sealing member made of rubber (hereinafter referred to as a rubber sealing member) as a primary seal and a sealing member made of resin (hereinafter referred to as a resin sealing member) which has a function as a secondary seal while maintaining the posture of the rubber sealing member.

CITATION LIST

Patent Literature

Patent Literature 1: WO 2011/030585 A1
Patent Literature 2: Japanese Utility Model Application Publication No. H3-41264

SUMMARY

Technical Problem

Here, there are cases where, due to sliding of the resin sealing member and the outer peripheral surface of the rotating shaft, heat is generated at sliding portions of the resin sealing member and an outer peripheral surface of the rotating shaft. In addition, according to the configuration of the sealing device disclosed in Patent Literature 1, the resin sealing member that maintains the posture of the rubber sealing member is provided so as to be in contact with the rubber sealing member. Accordingly, there is a possibility that the heat generated by the sliding of the resin sealing member and the outer peripheral surface of the rotating shaft is directly conducted from the resin sealing member to the rubber sealing member, and the rubber sealing member is thereby deteriorated. As the rubber sealing member deteriorates, its sealing properties degrade.

An object of the present disclosure is to suppress the degradation of the sealing properties resulting from the conduction of the heat generated by the sliding of the resin sealing member and the outer peripheral surface of the rotating shaft to the rubber sealing member.

Solution to Problem

The present disclosure has adopted the following means in order to solve the above problem.

That is, the sealing device of the present disclosure is a sealing device for sealing an annular gap between a rotating shaft and a housing having a shaft hole into which the rotating shaft is inserted, characterized by comprising: a first sealing member made of rubber comprising a lip portion that slides on an outer peripheral surface of the rotating shaft; a second sealing member made of resin being provided further to a side opposite to a sealed fluid side in an axial direction of the rotating shaft from the first sealing member, and comprising a lip portion that slides on the outer peripheral surface of the rotating shaft; a maintaining member made of metal being provided between the first sealing member and the second sealing member, and maintaining a posture of the first sealing member; and a case made of metal comprising: a cylindrical portion being fitted in an inner peripheral surface of the shaft hole; an inward flange extending inwardly in a radial direction of the rotating shaft from an end portion of the cylindrical portion on the side opposite; and a nail portion extending toward the sealed fluid side from an end portion of the inward flange, wherein the maintaining member comprises: a large diameter portion; an inward flange extending inwardly in the radial direction from an end portion of the large diameter portion on the side opposite, and being in contact with the inward flange of the case, the inward flange having a notch with which the nail portion is engaged; a small diameter portion being connected to an end portion of the large diameter portion on the sealed fluid side via a stepped portion, and being in contact with an inner peripheral surface of the lip portion of the first sealing member, and extending toward the sealed fluid side beyond a sliding portion of the lip portion of the second sealing member; and a lip retaining portion extending inwardly in the radial direction from an end portion of the small diameter portion on the sealed fluid side.

According to this configuration, because the small diameter portion of the maintaining member provided between the first sealing member and the second sealing member extends toward the sealed fluid side beyond the sliding portion of the lip portion of the second sealing member, the lip portion of the first sealing member and the lip portion of the second sealing member are not in contact with each other. Accordingly, heat generated by sliding of the lip portion of the second sealing member and the rotating shaft is not directly conducted to the first sealing member made of rubber from the second sealing member made of resin. Note that, because the maintaining member includes the lip retaining portion that extends inwardly in the radial direction from the end portion of the small diameter portion extending toward the sealed fluid side, even in the case where a pressure is applied from the sealed fluid side, it is possible to maintain the posture of the lip portion of the first sealing member. In addition, the maintaining member provided between the first sealing member and the second sealing member is made of metal. Accordingly, the heat generated by the sliding is likely to be conducted to the maintaining member. Further, the inward flange of the maintaining member is in contact with the inward flange of the metal case. Accordingly, the heat generated by the sliding is conducted to the metal case through the metal maintaining member, and is then released. Consequently, the heat generated by the sliding of the lip portion of the second sealing member and the rotating shaft is less likely to be conducted to the first sealing member.

In addition, the small diameter portion of the maintaining member preferably has an annular gap between the small diameter portion and an outer peripheral surface of the lip portion of the second sealing member in the radial direction. According to this configuration, because the lip portion of the second sealing member and the small diameter portion of the maintaining member are not in contact with each other, the heat generated by the sliding is less likely to be conducted to the small diameter portion of the maintaining member. Accordingly, the heat generated by the sliding is less likely to be conducted to the lip portion of the first sealing member that is in contact with the small diameter portion of the maintaining member.

Further, the sealing device of the present disclosure preferably includes a positioning member that pushes the first sealing member from the sealed fluid side and positions the first sealing member. According to this configuration, the positioning member pushes the first sealing member from the sealed fluid side in the axial direction of the rotating shaft toward the side opposite thereto. In doing so, a force that pushes the inward flange of the maintaining member against the inward flange of the case via the first sealing member is exerted. Accordingly, the inward flange of the case and the inward flange of the maintaining member that are both made of metal abut against each other with a strong force. As a result, the heat generated by the sliding and conducted to the maintaining member is likely to be conducted to the inward flange of the case through the inward flange of the maintaining member.

Advantageous Effects of the Disclosure

As described above, according to the present disclosure, it is possible to suppress the degradation of the sealing properties resulting from the conduction of the heat generated by the sliding of the resin sealing member and the outer peripheral surface of the rotating shaft to the rubber sealing member.

DRAWINGS

DETAILED DESCRIPTION

Hereinafter, modes for carrying out the present disclosure will be exemplarily described in detail based on examples thereof with reference to the attached drawings. However, the dimensions, materials, shapes, relative arrangements and so on of constituent parts described in the examples are not intended to limit the scope of the present disclosure to these alone in particular unless specifically described.

First Example

With reference to FIGS. 1 to 3B, a sealing device according to a first example of the present disclosure will be described.

<Application Example of Sealing Device>

Figure 1:
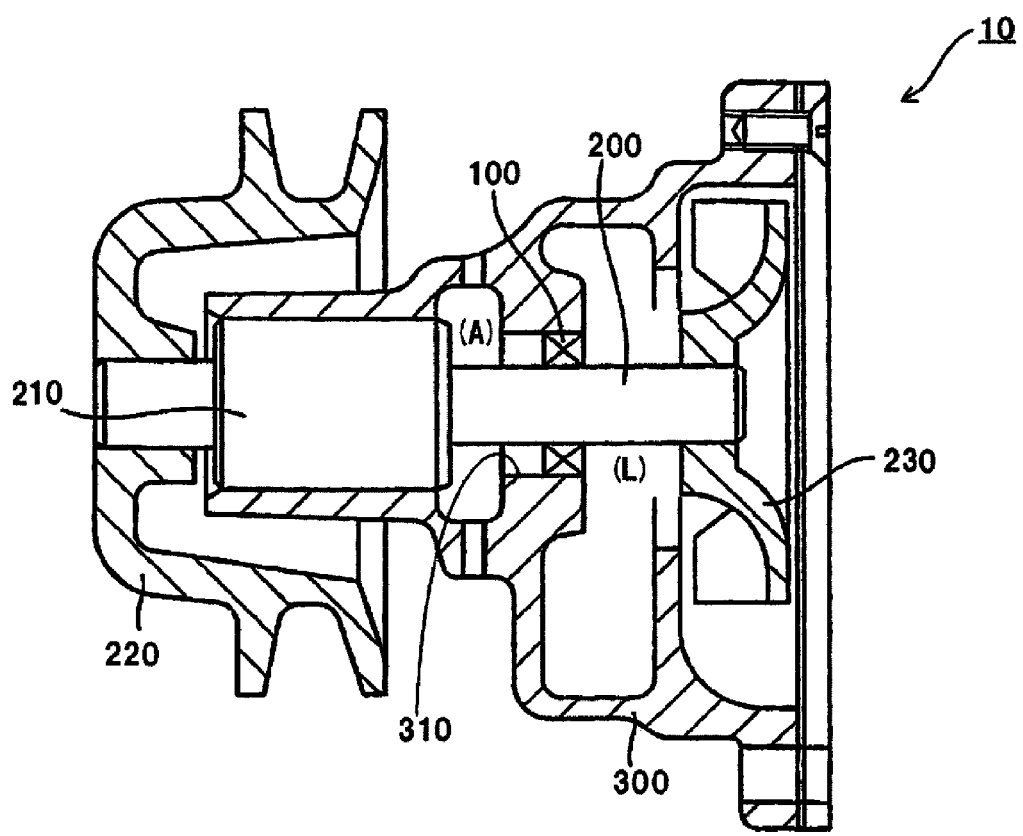
FIG. 1 is a schematic cross-sectional view showing an application example of a sealing device according to an example of the present invention.

With reference to FIG. 1, an application example of a sealing device according to the example of the present disclosure will be described. FIG. 1 is a schematic cross-sectional view showing the application example of the sealing device according to the example of the present disclosure, and is a schematic cross-sectional view of a water pump 10 for an automobile. The water pump 10 includes a rotating shaft 200, and a housing 300 having a shaft hole 310 into which the rotating shaft 200 is inserted. To the rotating shaft 200, a bearing 210 for smoothing the rotation of the rotating shaft 200 is attached. In addition, a pulley 220 to which a rotational driving force is given by a belt (not shown) or the like is attached to one end side of the rotating shaft 200, and an impeller 230 for pressuring and sending cooling water is attached to the other end side thereof. In addition, a sealing device 100 according to the present example is disposed in an annular gap between the rotating shaft 200 and the housing 300 in order to prevent leakage of the cooling water to the outside (i.e., an air side (A) opposite to a sealed fluid side (L)). In the present example, a sealed fluid is the cooling water.

<Configuration of Sealing Device>

Figure 2:
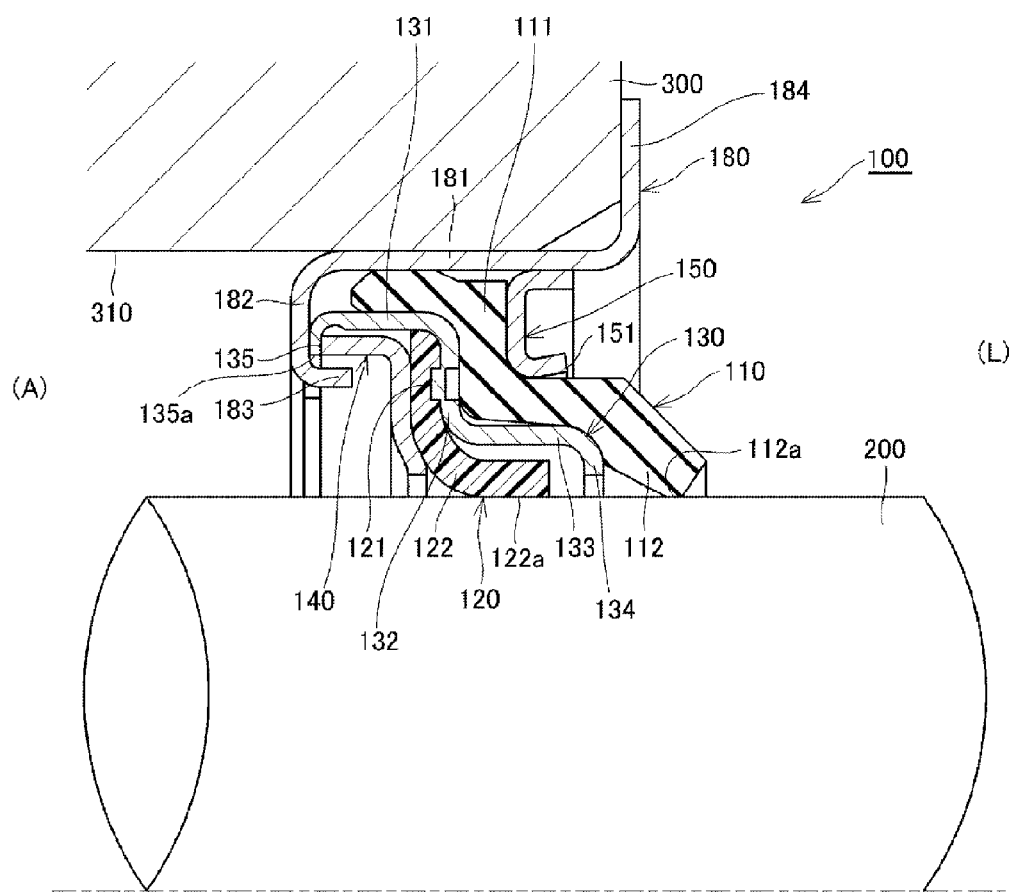
FIG. 2 is a schematic cross-sectional view showing a usage state of a sealing device according to a first example of the present disclosure.

Next, with reference to FIG. 2, the configuration of the sealing device 100 according to the first example of the present disclosure will be described. FIG. 2 is a schematic cross-sectional view showing a usage state of the sealing device according to the first example of the present disclosure. The sealing device 100 according to the first example is a device that seals the annular gap between the rotating shaft 200 and the housing 300 having the shaft hole 310 into which the rotating shaft 200 is inserted.

The sealing device 100 includes a rubber sealing member 110 as a first sealing member made of rubber, a resin sealing member 120 as a second sealing member made of resin, a support ring 130 as a maintaining member, a backup ring 140, and an adaptor 150 as a positioning member. In addition, the sealing device 100 includes a case 180 that integrally retains these individual members.

The rubber sealing member 110 includes a tubular portion 111 and a rubber lip portion 112 that extends inwardly in a radial direction of the rotating shaft 200 from the tubular portion 111. The rubber lip portion 112 slides on an outer peripheral surface of the rotating shaft 200 with a sliding portion (sliding surface) 112a as a tip portion (tip surface).

The resin sealing member 120 includes an annular portion 121 and a resin lip portion 122 that extends inwardly in the radial direction of the rotating shaft 200 from the annular portion 121. The resin lip portion 122 slides on the outer peripheral surface of the rotating shaft 200 with a sliding portion (sliding surface) 122a as a tip portion (tip surface). In addition, the resin sealing member 120 is provided further to an air side (A) in an axial direction of the rotating shaft 200 from the rubber sealing member 110.

The support ring 130 is made of metal, and is provided between the rubber sealing member 110 and the resin sealing member 120. In addition, in the case where a pressure is applied from a sealed fluid side (L side), the support ring 130 suppresses deformation of the posture of the rubber sealing member 110.

In addition, in the first example, the support ring 130 has a large diameter portion 131, a stepped portion 132 that extends inwardly in the radial direction from the tip of the large diameter portion 131 on the sealed fluid side (L side), and a small diameter portion 133 that is connected to the large diameter portion 131 via the stepped portion 132.

Further, the support ring 130 includes an inward flange 135 that extends inwardly from an end portion of the large diameter portion 131 on the air side (A side). Notches are provided at regular intervals in a circumferential direction on the inward flange 135. In the first example, three notches 135a are provided in the circumferential direction on the inward flange 135.

Furthermore, the support ring 130 has a lip retaining portion 134 that extends inwardly in the radial direction from an end portion of the small diameter portion 133 on the sealed fluid side (L side). In the case where a pressure is applied from the sealed fluid side (L side), the lip retaining portion 134 suppresses deformation of the posture of the rubber lip portion 112 of the rubber sealing member 110.

The small diameter portion 133 of the support ring 130 is in contact with the inner peripheral surface of the rubber lip portion 112 of the rubber sealing member 110 and extends toward the sealed fluid side (L side) beyond the sliding portion 122a of the resin lip portion 122 of the resin sealing member 120 against the outer peripheral surface of the rotating shaft. Accordingly, the small diameter portion 133 is provided between the rubber lip portion 112 of the rubber sealing member 110 and the resin lip portion 122 of the resin sealing member 120, and prevents these sealing members from coming into contact with each other. In addition, the small diameter portion 133 has an annular gap between the small diameter portion 133 and the outer peripheral surface of the resin lip portion 122 of the resin sealing member 120 in the radial direction, and hence decentering or the like of the rotating shaft 200 can be tolerated.

The backup ring 140 is made of metal, and is provided further to the air side (A side) from the resin sealing member 120. The backup ring 140 is held between the inward flange 135 of the support ring 130 and the resin sealing member 120. In addition, in the case where a pressure is applied from the sealed fluid side (L side), the backup ring 140 suppresses deformation of the posture of the resin sealing member 120.

As shown in FIG. 2, the adaptor 150 pushes the rubber sealing member 110 from the sealed fluid side (L side) and thereby positions the rubber sealing member 110 in the axial direction. In addition, the adaptor 150 prevents the rubber sealing member 110 from being detached toward the sealed fluid side (L side).

In addition, in the present example, as shown in FIG. 2, the adaptor 150 has a substantially U-shaped cross section, and of the portion of the adaptor 150 that is in contact with the rubber lip portion 112 of the rubber sealing member 110, the sealed fluid side (L side) is inclined outwardly in the radial direction so as to be spaced apart from the rubber lip portion 112. As a result, in a state in which the sealing device 100 is attached to the housing 300, even when the rubber sealing member 110 is deformed outwardly in the radial direction, an edge portion 151 of the adaptor 150 is prevented from coming into contact with the rubber lip portion 112 of the rubber sealing member 110. As a result, the rubber sealing member 110 is prevented from being damaged due to the contact with the edge portion 151 of the adaptor 150. However, in the present disclosure, the shape of the adaptor 150 is not limited to the shape shown in FIG. 2, and a configuration in which the adaptor 150 is not be inclined may be employed.

The case 180 has a cylindrical portion 181 that is fitted in the shaft hole 310 and an inward flange 182 that extends inwardly in the radial direction from the tip of the cylindrical portion 181 on the air side (A side). In addition, the case 180 has nail portions 183 that extend toward the sealed fluid side (L side) from the end portion of the inward flange 182. In the first example, the nail portions 183 are provided at three places in the circumferential direction and are engaged with the notches 135a of the support ring 130.

In addition, in the first example, the case 180 has a positioning portion 184 that extends outwardly in the radial direction from the end portion of the cylindrical portion 181 on the sealed fluid side (L side) so as to follow the shape of the housing 300 and positions the case 180 in the axial direction. The case 180 is a metal member similarly to the support ring 130 and the backup ring 140.

With reference to FIG. 3, assembly procedures of the sealing device 100 will be described herein. FIG. 3 is a schematic cross-sectional view showing the assembly procedures of the sealing device according to the first example.

Firstly, the annular portion 121 of the resin sealing member 120 is placed inside the support ring 130. Thereafter, the backup ring 140 is fitted into the support ring 130 (see FIG. 3A). Next, the end portion of the support ring 130 on the left side in the drawing is folded inwardly, and the inward flange 135 is thereby formed (see an arrow in FIG. 3A). Subsequently, onto a unit composed of the support ring 130, the resin sealing member 120, and the backup ring 140, the rubber sealing member 110 is mounted (see FIG. 3B).

Figure 3A:
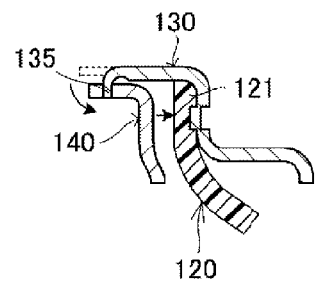
FIGS. 3A to 3D are schematic cross-sectional views showing assembly procedures of the sealing device according to the first example of the present disclosure.
Figure 3B:
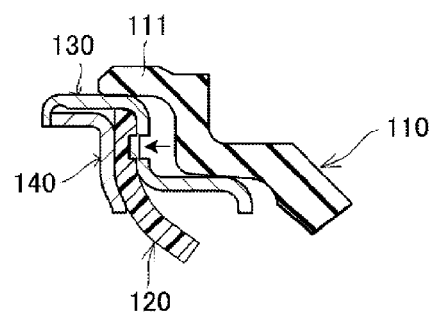
Figure 3C:
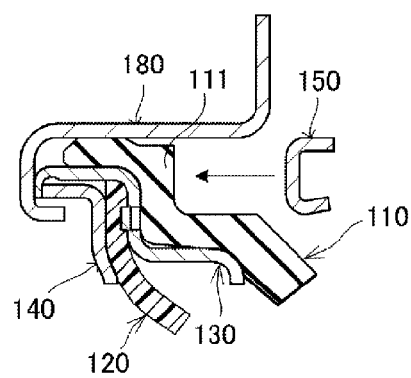
Figure 3D:
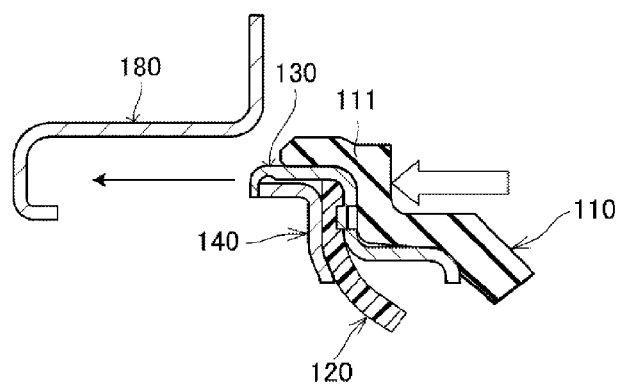

Thereafter, a unit composed of those members is pushed into the case 180 along the inner peripheral surface of the case 180 in the axial direction, and the tubular portion 111 of the rubber sealing member 110 is fitted into the inner peripheral surface of the case 180 (see FIG. 3C). Subsequently, the adaptor 150 is press-fitted into the inner-peripheral surface of the case 180. With the configuration described above, the above members are integrally constructed as a cartridge. That is, it becomes possible to handle the rubber sealing member 110, the resin sealing member 120, the support ring 130, the backup ring 140, the adaptor 150, and the case 180 as one component.

<Advantages of the Sealing Device According to the First Example>

Next, with reference to FIG. 2, advantages of the sealing device according to the first example will be described.

In the case where the sliding portion 122a of the resin lip portion 122 and the rotating shaft 200 slide for a long period of time, there are cases where heat is generated by the sliding. When the heat is conducted to the rubber sealing member 110, there is a possibility that the rubber sealing member 110 is deteriorated. When the rubber sealing member 110 is deteriorated, sealing properties are degraded.

However, according to the configuration of the sealing device 100 according to the first example, because the support ring 130 is provided between the rubber sealing member 110 and the resin sealing member 120, the rubber sealing member 110 and the resin sealing member 120 are not in contact with each other, and hence the heat generated at the sliding portion 122a is not directly conducted to the rubber sealing member 110.

In addition, the metal support ring 130 is in contact with the inward flange 182 of the metal case 180 at the inward flange 135. Accordingly, the heat generated at the sliding portion 122a is conducted to the case 180 through the inward flange 135 of the support ring 130. The heat conducted to the metal case 180 in this manner is released to the air side (A side) at the inward flange 182 of the case 180.

Further, in the configuration of the first example, the small diameter portion 133 of the support ring 130 is in contact with the inner peripheral surface of the rubber lip portion 112 of the rubber sealing member 110, and is not in contact with the resin lip portion 122 of the resin sealing member 120. That is, in the radial direction, the small diameter portion 133 of the support ring 130 and the resin lip portion 122 of the resin sealing member 120 have an annular gap in between. Accordingly, the heat generated at the sliding portion 122a is not directly conducted to the small diameter portion 133 of the support ring 130 from the resin lip portion 122. The heat generated at the sliding portion 122a is conducted to the annular portion 121 from the resin lip portion 122, and is then conducted to the stepped portion 132 and the large diameter portion 131 of the support ring 130 that are in contact with the annular portion 121. In this case, even when the heat is conducted to the tubular portion 111 from the large diameter portion 131, an influence on sealing properties is smaller than that in the case where the heat is conducted to the rubber lip portion 112.

Furthermore, there are cases where heat is generated by sliding of the rubber lip portion 112 and the rotating shaft 200. However, the rubber lip portion 112 is in contact with the small diameter portion 133 and the lip retaining portion 134 of the metal support ring, and hence the heat generated by the sliding of the rubber lip portion 112 and the rotating shaft 200 is likely to be conducted to the small diameter portion 133 and the lip retaining portion 134. The heat conducted to the small diameter portion 133 and the lip retaining portion 134 of the support ring 130 is conducted to the case 180 through the stepped portion 132, the large diameter portion 131, and the inward flange 135, and is then released.

As described above, in the configuration of the first example, even when the heat is generated by the sliding of the sliding portion 122a of the resin sealing member 120 and the rotating shaft 200, the heat is less likely to be conducted to the rubber sealing member 110. In addition, the heat is likely to be released to the outside of the sealing device 100 through the metal members. Accordingly, it is possible to suppress of sealing properties degradation resulting from deterioration of the rubber sealing member 110.

Second Example

Figure 4:
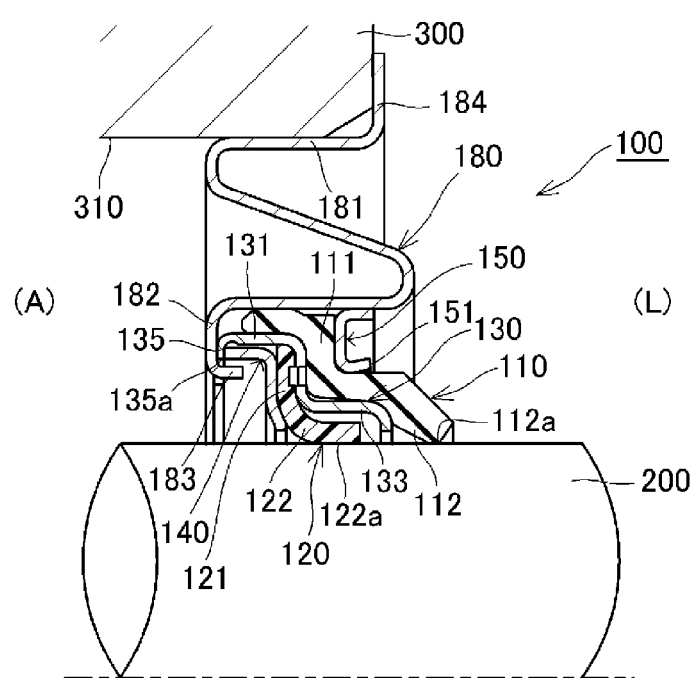
FIG. 4 is a schematic cross-sectional view showing a usage state of a sealing device according to a second example of the present disclosure.
Figure 5A:
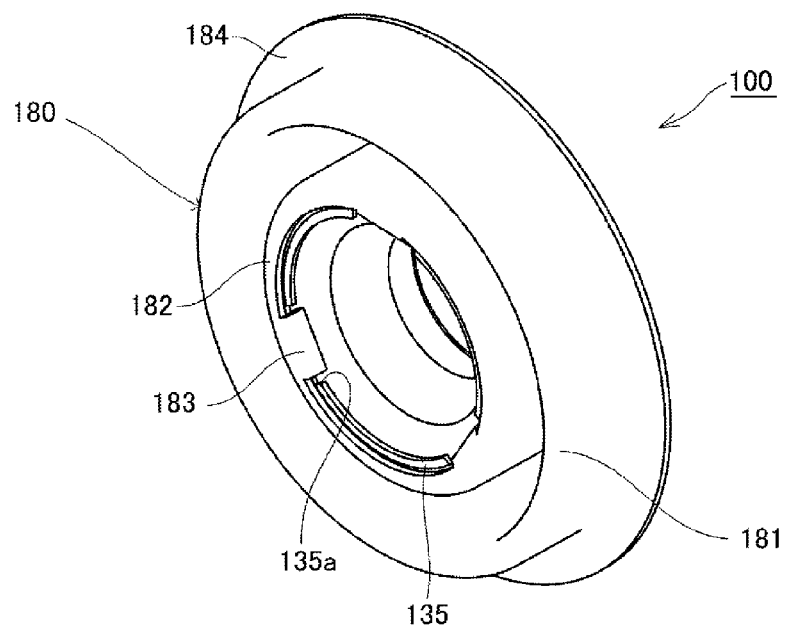
FIGS. 5A and 5B are a perspective view of an external appearance and a front view each showing the sealing device according to the second example of the present disclosure.
Figure 5B:
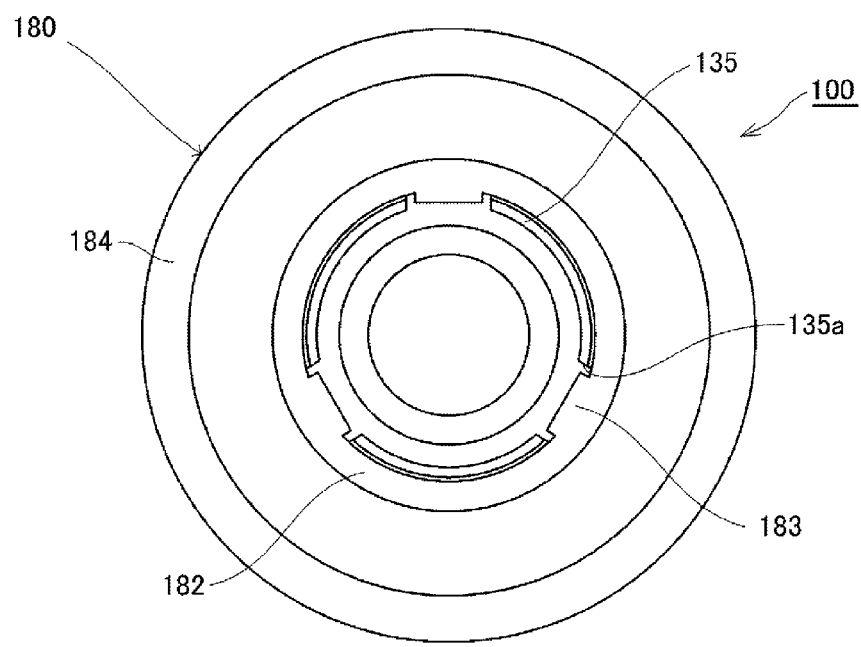

With reference to FIGS. 4 and 5, a second example of the present disclosure will be described. FIG. 4 is a schematic cross-sectional view showing a usage state of the sealing device 100 according to the second example of the present disclosure. FIG. 5A is a perspective view of an external appearance of the sealing device 100 according to the second example of the present disclosure, and FIG. 5B is a front view of the sealing device 100 when viewed from the air side (A side).

In the present example, a modification of the case in the first example will be described. The other constituent parts and their operations are the same as those in the first example, thus the same constituent parts are designated by the same reference numerals as those in the first example, and the description thereof will be omitted.

There are cases where the size of the annular gap to be sealed by the sealing device 100 becomes larger depending on the relations between the rotating shaft 200 and the diameter of the shaft hole 310 of the housing 300. Accordingly, in the sealing device 100 according to the present example, by providing elasticity in the radial direction by providing a portion 186 having an S-shaped cross section of the case 180, sufficient sealing properties are exhibited even in the case of a large annular gap without degrading ease of fitting. The constituent parts other than the case 180 are as described in the first example, and hence the description thereof will be omitted.

Third Example

Figure 6:
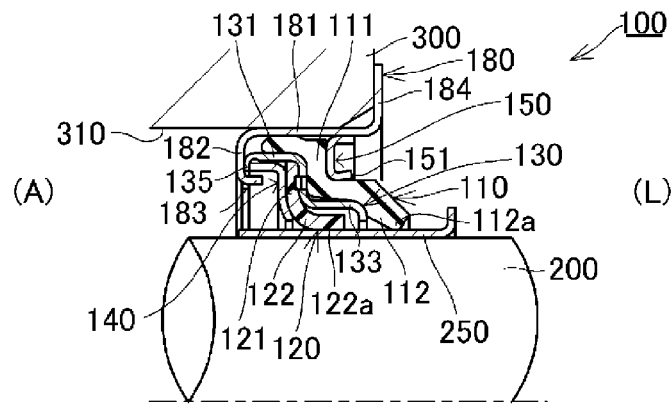
FIG. 6 is a schematic cross-sectional view showing a usage state of a sealing device according to a third example of the present disclosure.

FIG. 6 shows a third example of the present disclosure. In the present example, a metal sleeve 250 that is fitted on the outer peripheral surface of the rotating shaft 200 is used. The other constituent parts and their operations are the same as those in the first and second examples, thus the same constituent parts are designated by the same reference numerals as those in the first and second examples, and the description thereof will be omitted.

The sleeve 250 is provided in order to facilitate insertion of the rotating shaft 200 into the shaft hole 310 of the housing 300 and protect the outer peripheral surface of the rotating shaft 200. By the rotation of the rotating shaft 200, the sleeve 250 rotates while sliding relative to the sliding portion 112a of the rubber lip portion 112 and the sliding portion 122a of the resin lip portion 122. That is, the present disclosure is not limited to the configuration in which the sliding portion 112a of the rubber lip portion 112 and the sliding portion 122a of the resin lip portion 122 slide directly on the outer peripheral surface of the rotating shaft 200, and may have a configuration in which the sliding portion 112a thereof and the sliding portion 122a thereof slide on the outer peripheral surface of the sleeve 250 which rotates integrally with the rotating shaft 200.

Here, the sleeve 250 is a metal member. Accordingly, in the case where heat is generated by sliding of the sleeve 250 and the sliding portion 122a of the resin lip portion 122, the heat is released through not only the support ring 130 but also the sleeve 250. That is, as compared with the configuration of the first example, it is possible to release the heat generated by the sliding more effectively, and hence it is possible to suppress the deterioration of the rubber sealing member 110. The configuration of the present example is particularly effective in the case where the material of the rotating shaft 200 is a material that has low thermal conductivity such as resin or the like.

Fourth Example

Figure 7:
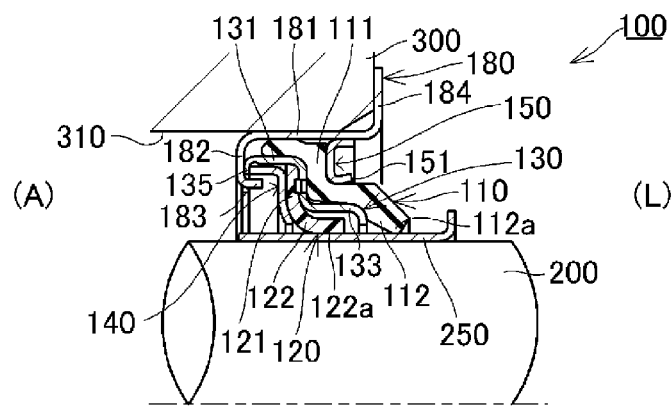
FIG. 7 is a schematic cross-sectional view showing a usage state of a sealing device according to a fourth example of the present disclosure.

FIG. 7 shows a fourth example of the present disclosure. The present example is an example in which the sleeve 250 used in the third example is adopted in the configuration of the first example. The other constituent parts and their operations are the same as those in the first example, thus the same constituent parts are designated by the same reference numerals as those in the first example, and the description thereof will be omitted.

Fifth Example

Figure 8:
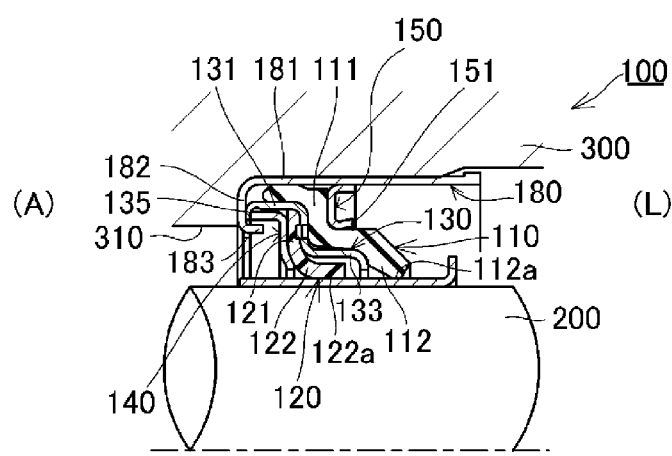
FIG. 8 is a schematic cross-sectional view showing a usage state of a sealing device according to a fifth example of the present disclosure.

FIG. 8 shows a fifth example of the present disclosure. In the present example, a modification of the case in the first example will be described. The other constituent parts and their operations are the same as those in the first example, thus the same constituent parts are designated by the same reference numerals as those in the first example, and the description thereof will be omitted.

In the first example, the configuration in which the case 180 has the positioning portion 184 which extends outwardly in the radial direction so as to follow the shape of the housing 300 is adopted, whereas in the present example, the case 180 does not have the positioning portion 184. In the present example, the inward flange 182 of the case 180 is in contact with the housing 300 in the axial direction and thereby plays a role as the positioning portion.

Sixth Example

Figure 9:
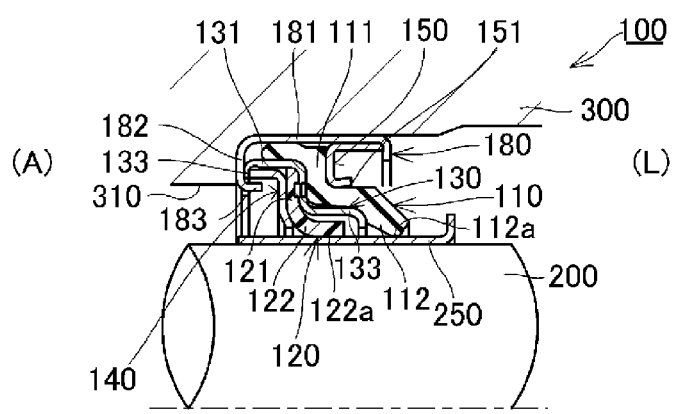
FIG. 9 is a schematic cross-sectional view showing a usage state of a sealing device according to a sixth example of the present disclosure.

FIG. 9 shows a sixth example of the present disclosure. In the present example, a modification of the case in the first example will be described. The other constituent parts and their operations are the same as those in the first example, thus the same constituent parts are designated by the same reference numerals as those in the first example, and the description thereof will be omitted.

Similarly to the fifth example, the case 180 of the present example does not have the positioning portion 184 of the first example. The end portion of the cylindrical portion 181 of the case 180 on the sealed fluid side (L side) is bent inwardly in the radial direction, and holds the adaptor 150. Accordingly, the adaptor 150 is not detached toward the sealed fluid side (L side). Note that, as shown in FIG. 9, in the present example, the length of the adaptor 150 in the axial direction is longer than those in the other examples. The bend of the end portion of the case 180 on the sealed fluid side (L side) can be appropriately adjusted according to the length of the adaptor 150.

Note that, although the configuration having the sleeve 250 is described in each of the fifth and sixth examples, the configuration is not limited thereto, and a configuration in which the rubber lip portion 112 and the resin lip portion 122 slide directly on the outer peripheral surface of the rotating shaft 200 can be employed.

REFERENCE SIGNS LIST

10 water pump
100 sealing device
110 rubber sealing member
111 tubular portion
112 rubber lip portion
112a sliding portion
120 resin sealing member
121 annular portion
122 resin lip portion
122a sliding portion
130 support ring
131 large diameter portion
132 stepped portion
133 small diameter portion
134 lip retaining portion
135 inward flange
135a notch
140 backup ring
150 adaptor
151 edge portion
180 case
181 cylindrical portion
182 inward flange
183 nail portion
184 positioning portion
200 rotating shaft
210 bearing
220 pulley
230 impeller
250 sleeve
300 housing
A air side
L sealed fluid side

The invention claimed is:

1. A sealing device for sealing an annular gap between a rotating shaft and a housing having a shaft hole into which the rotating shaft is inserted, the sealing device comprising:
a first sealing member made of rubber comprising a tubular portion and a lip portion that extends radially inward from the tubular portion and that slides on an outer peripheral surface of the rotating shaft;
a second sealing member made of resin being provided further to a side opposite to a sealed fluid side in an axial direction of the rotating shaft from the first sealing member, and comprising a lip portion that slides on the outer peripheral surface of the rotating shaft;
a maintaining member made of metal being provided between the first sealing member and the second sealing member, and maintaining a posture of the first sealing member; and
a case made of metal comprising: a cylindrical portion being fitted in and making contact with an inner peripheral surface of the shaft hole; an inward flange extending inwardly in a radial direction of the rotating shaft from an end portion of the cylindrical portion on the side opposite; and a nail portion extending toward the sealed fluid side from an end portion of the inward flange, wherein
the maintaining member comprises:
a large diameter portion, the tubular portion being fitted between the cylindrical portion of the case and an outer surface of the large diameter portion;
an inward flange extending inwardly in the radial direction from an end portion of the large diameter portion on the side opposite, and being in contact with the inward flange of the case, the inward flange having a notch with which the nail portion is engaged;
a small diameter portion being connected to an end portion of the large diameter portion on the sealed fluid side via a stepped portion, and being in contact with an inner peripheral surface of the lip portion of the first sealing member, and extending toward the sealed fluid side beyond a sliding portion of the lip portion of the second sealing member; and
a lip retaining portion extending inwardly in the radial direction from an end portion of the small diameter portion on the sealed fluid side, wherein in an installed condition the small diameter portion has an annular gap between the small diameter portion and an outer peripheral surface of the lip portion of the second sealing member in the radial direction.

2. The sealing device according to claim 1, further comprising a positioning member that pushes the first sealing member from the sealed fluid side and positions the first sealing member.

* * * * *